No. 612,616. Patented Oct. 18, 1898.
W. H. PORTER.
GAS TIP.
(Application filed May 7, 1896. Renewed Feb. 15, 1898.)
(No Model.)
Fig. 1.
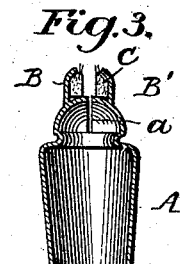
Fig. 3.
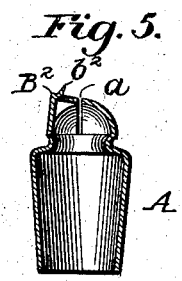
Fig. 5.
Fig. 2.
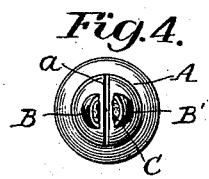
Fig. 4.
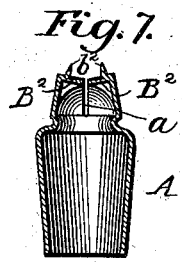
Fig. 7.
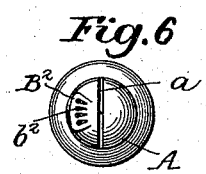
Fig. 6.
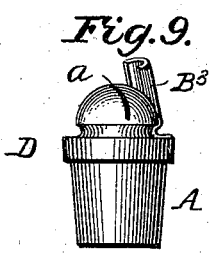
Fig. 9.
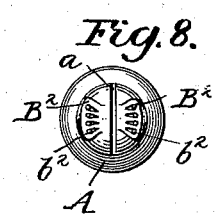
Fig. 8.
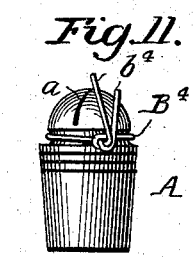
Fig. 11.
Fig. 10.
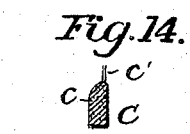
Fig. 13.
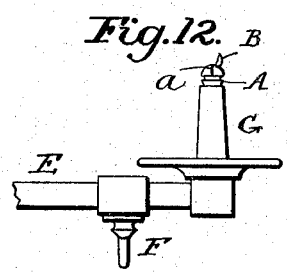
Fig. 12.
Fig. 14.
Witnesses
Inventor
William H. Porter
by Foster Freeman
Attorneys
THE NORRIS PETERS CO., PHOTO-LITHO., WASHINGTON, D. C.

UNITED STATES PATENT OFFICE.

WILLIAM H. PORTER, OF NEW YORK, N. Y., ASSIGNOR TO THE AIR LIGHTER COMPANY, OF SAME PLACE.

GAS-TIP.

SPECIFICATION forming part of Letters Patent No. 612,616, dated October 18, 1898.

Application filed May 7, 1896. Renewed February 15, 1898. Serial No. 670,435. (No model.)

*To all whom it may concern:*

Be it known that I, WILLIAM H. PORTER, a citizen of the United States, residing in the city, county, and State of New York, have invented certain new and useful Improvements in Gas-Tips, of which the following is a specification.

This invention relates to catalytic gas-lighting devices; and it consists of a new gas-tip having catalytic material so applied that the mere turning on of illuminating or other combustible gas will cause its ignition. The catalytic material which I make use of is the one described in my application, Serial No. 547,172, filed April 25, 1895, and I do not deem it necessary herein to further describe in detail such material except to state that such material consists of a mixture of one or more members of the platinum group with aluminium oxid or some other infusible oxid.

I do not in this application claim any particular catalytic material, such as is described in my applications Serial Nos. 570,464 and 590,609.

In the catalytic material used and which causes ignition there are to be distinguished two parts. The first part is a stable base which causes combination between the combustible gas and air, whereby the material itself is raised to a red heat and will glow, but does not attain sufficient temperature to cause ignition of the gas, such a base being preferably porous. The second part is fibrous or filamental material projecting from the base, and which fibrous or filamental material has a catalytic action when hot and may also be of a kind that possesses catalytic action when cold. The fibers or filaments may also be impregnated with catalytic material, which increases the rapidity of action. Said rapidity of ignition is also increased whenever the mineral fibers or filaments are porous, whether they also possess catalytic action when cold or not. I have discovered that by placing such material in the form of a tuft, as above, at one or both sides of the gas-outlet of a burner-tip, so that it will be on one or both sides of the flame when the burner is in use, the speed with which the gas is lighted is greater than when it occupies any other position.

The novel features of my invention will be further elucidated by the accompanying drawings and the appended description.

In the drawings, Figures 1 and 2 represent a vertical section and plan view, respectively, of one form of tip embodying my invention. Figs. 3 and 4 represent a vertical section and plan view, respectively, of another form of tip in which the catalytic material is applied on both sides of the slot. Figs. 5 and 6 represent a vertical section and a plan view, respectively, of another form of gas-tip embodying my invention. Figs. 7 and 8 represent a vertical section and a plan view of the same tip arranged so as to contain catalytic material on both sides of the slot. Figs. 9, 10, 11, and 12 represent in elevation still further modifications of tips embodying my invention; and Figs. 13 and 14 represent, respectively, a section and elevation, on an enlarged scale, of a lighting-tuft.

Similar letters of reference represent similar parts throughout the illustrations.

Referring to Fig. 1, A represents the body of the tip, which may be of any usual material, such as metal or so-called "lava," and of any of the usual forms, said tip being provided with a slot or opening $a$ for the passage of the illuminating-gas in the ordinary way. Arranged adjacent to this opening is a support B, in this case shown as a cup-shaped receptacle or holder on the end of the tip at one side of the opening $a$. This holder or support may be formed with or attached to the body of the tip in any desired manner, and in this particular instance I have shown it provided with a tongue or projection $b$, fitting an opening or slot $a'$, formed in the body of the tip, and to which it may be soldered or otherwise secured. The contour of this holder will vary according to the requirements of any particular case and may be made larger or smaller or of different shapes to receive the stable catalytic material. In some instances I have found it advantageous to flatten or cut away the end of the tip, as at $a^2$, to form a sort of platform or support for the catalytic material in immediate proximity to the opening in the tip. The holder $b$ may be made of the same material as the body of the tip or may be of other material, the essential feature being that it shall be capable of withstanding the heat developed in the catalytic material and in the flame of the burning gas without deterioration or deleterious influence upon the catalytic material.

The body A of the tip is preferably made slightly tapering to adapt it to fit any ordinary gas fixture or burner.

In Figs. 3 and 4 a somewhat similar construction is shown, in which the body A is provided with two holders B B', arranged on opposite sides of the opening $a$ in the tip, and these are shown as of a convenient shape and, as before, may be formed with or attached to the body of the tip. On one side, as at C, I have represented the stable catalytic material in position in the support or holder, and it will be understood that it may be applied to one or both of the holders or supports, and I have omitted to show the catalytic material applied to some of the tips for the purpose of clearness.

It will be seen that when the gas is turned on and caused to flow through the opening the tendency of the gas and also the heat when started is upward, and it is only necessary that the catalytic material be placed in such relation to the opening that some of the gas shall come in contact with it and act upon it to cause it to be heated, so that the fibrous or filamental part thereof will ignite the gas.

In Figs. 5 and 6 another form of tip is shown in which the body A is provided with a raised platform $B^2$, forming a support or holder for the catalytic material. In this form the catalytic material is supported on a plane with or above the opening $a$, and in this way the catalytic material may be brought in close proximity with the body of the gas as it passes from the opening. In order to aid in retaining the catalytic material on the platform, it is shown as provided with barbs, points, or projections $b^2$, which may be formed by raising a portion of the platform itself or may be attached thereto in any desirable and well-known way, and thus furnish a substantial and permanent support for said material.

In Figs. 7 and 8 a similar construction is shown in which the body A is provided with two raised platforms $B^2$, arranged on opposite sides of the opening $a$ in the tip.

In Fig. 9 the body A is provided with a support which is detachable or removable from the tip, and in this case the holder or support $B^3$ consists of a curved extension projecting over a dome and adapted to receive and support the catalytic material, while it is secured to the body by a ring D, embracing the body and connected with the support. This form is more especially adapted to so-called "lava" tips, or tips made of a material that is not easily formed into or provided with an integral support, although, of course, the particular material of the tip or support is an unimportant feature of the construction.

In Fig. 10 I have shown the body of the tip provided with the catalytic material C, attached directly to the body or surface of the tip by any suitable means, as an adhesive substance.

In Fig. 11 the body A is provided with a support $B^4$ in the form of a wire bent around the neck of the tip and secured thereto and having projecting ends $b^4$ extending up adjacent to the opening and serving to receive and support the catalytic material.

In Fig. 12 I have indicated roughly one manner of using my invention, in which E is the pipe of an ordinary gas-tip, having a cock F, controlling the flow of ordinary illuminating-gas to the burner G, and this burner is provided with a tip A, having a mass C of the catalytic material arranged adjacent to the opening, so that when the cock is turned, permitting the illuminating-gas to flow to the tip, it is automatically ignited through the influence of the fibrous or filamental part of the catalytic material, and this operation may be repeated practically indefinitely with the same result. Moreover, if perchance the ignited gas is blown out or the flow of gas interrupted from any cause it will be again ignited when it reaches the opening of the tip.

In Figs. 13 and 14 I have illustrated somewhat roughly the preferred form of catalytic material, it being in the shape of a tuft having a body or base portion $c$ and fibrous or filamental portions $c'$. The base being preferably made porous, as well as the filaments, the action is much quicker than if said elements were made solid.

What I claim is—

1. A gas-tip provided with stable catalytic material consisting of a porous base and non-metallic mineral igniting fibers as described.

2. A gas-tip provided with stable catalytic material consisting of a porous base, and porous non-metallic mineral igniting fibers as described.

3. A gas-tip provided with stable catalytic material consisting of a porous base, and porous mineral igniting fibers, said fibers having a catalytic action when cold as described.

4. A gas-tip provided with stable catalytic material, consisting of a base and non-metallic, mineral fibers or filaments, applied relatively to the gas-outlet so as to be parallel with and on one side of the flame when the tip is in use as described.

5. A gas-tip provided with stable catalytic material consisting of a base and non-metallic, mineral fibers or filaments applied relatively to the gas-outlet, so as to be parallel with and on each side of the flame when the gas-tip is in use as described.

6. A gas-tip provided with stable catalytic material consisting of a base and non-metallic, mineral fibers or filaments, applied relatively to the gas-outlet so as to be parallel with and on one side of the flame when the tip is in use, said fibers or filaments having catalytic action when cold, as described.

7. A gas-tip provided with stable catalytic material, consisting of a base and non-metallic, mineral fibers or filaments, applied relatively to the gas-outlet, so as to be parallel with and on each side of the flame when the gas-tip is in use, the fibers or filaments having catalytic action when cold, as described.

8. A gas-tip provided with a platform located relatively to the gas-outlet so as to be parallel with and on one side of the flame, when the tip is in use, and provided with barbs serving to hold the catalytic material in position as described.

9. A gas-tip provided with a platform located relatively to the gas-outlet so as to be parallel with and on each side of the flame when the tip is in use, said platform being provided with barbs serving to hold the catalytic material in position, as described.

In testimony whereof I have signed my name to this specification in the presence of two subscribing witnesses.

WILLIAM H. PORTER.

Witnesses:
CLAUDE A. O. ROSELL,
EDWARD R. MEEK.